Feb. 7, 1939. J. W. LEIGHTON 2,146,149
LINK CONNECTION AND METHOD OF MAKING SAME
Filed March 13, 1936
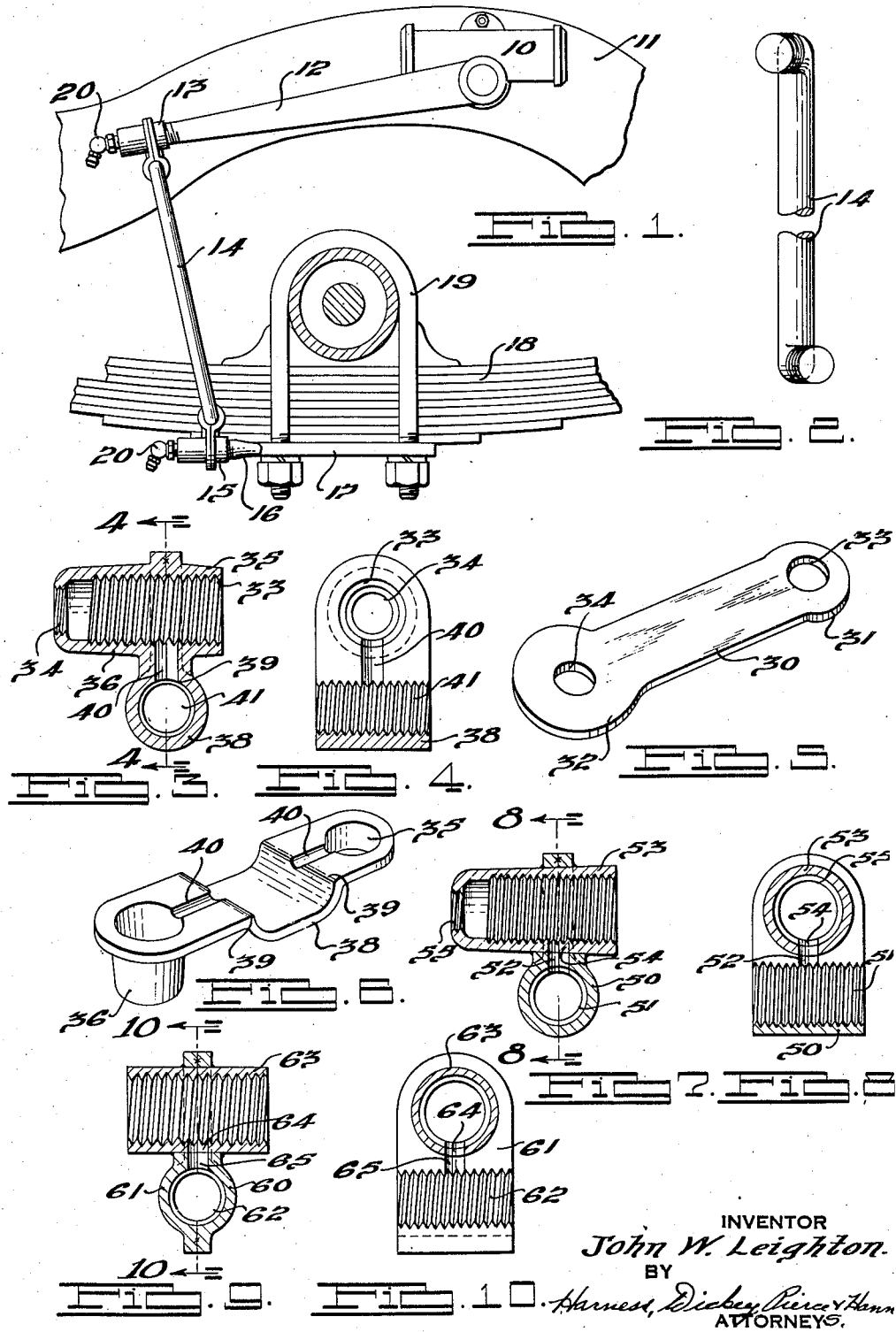
INVENTOR
John W. Leighton
BY
Harness, Dickey, Pierce & Hann
ATTORNEYS.

Patented Feb. 7, 1939

2,146,149

UNITED STATES PATENT OFFICE 2,146,149

LINK CONNECTION AND METHOD OF MAKING SAME

John W. Leighton, Port Huron, Mich.

Application March 13, 1936, Serial No. 68,596

9 Claims. (Cl. 29—152)

This invention relates generally to pivotal connections. More particularly it relates to a novel and extremely simple form of pivotal connection and a particularly effective and simple method of manufacturing the same.

While the specific embodiment of the invention illustrated in the accompanying drawing and described below shows a pivotal connection adapted for providing threaded bearings between the various elements of a shock absorber assembly, it will be clearly apparent that the inventive concept disclosed herein will find broad and practical utility in many other fields.

It is a general object of the present invention to provide a pivotal connection construction which is formed entirely from sheet metal parts and which provides a pair of internally threaded bearings arranged in substantially crossed axis relation.

Yet another object of the present invention is to provide an improved pivotal connection having a pair of internally threaded bores and having a lubricant duct providing communication between said bores whereby lubricant introduced to the threaded bearing of one of said bores will inherently serve to supply lubricant for the other of said bores.

Yet another object of the present invention consists in certain novel steps performed in the manufacture of the improved pivotal connection of the present invention. The present invention contemplates the provision of a pivotal connection formed of an integral, single sheet metal stamping which is formed and bent to provide the desired crossed axis bores in spaced relation to each other and the inter-communicating lubricant duct therebetween.

Many other and further objects and advantages of the present invention will become apparent from the following specification when considered in connection with the accompanying drawing forming a part thereof.

In the drawing:

Figure 1 is a fragmentary elevational view of a vehicle axle suspension employing a shock absorber assembly connected together by means of pivotal connections formed in accordance with the teachings of the present invention;

Figure 2 is an enlarged detail view illustrating the construction of the link which extends between the improved pivotal connections;

Figure 3 is a sectional view through a pivotal connection formed in accordance with the teachings of the present invention, showing the interior construction thereof;

Figure 4 is a transverse sectional view taken substantially on the line 4—4 of Fig. 3 illustrating the improved pivotal connection;

Figure 5 is a perspective view illustrating a form of blank particularly adaptable for producing links in accordance with the method;

Figure 6 is a perspective view of a blank such as is shown in Fig. 5 after it has been subjected to preliminary forming operations;

Figure 7 is a longitudinal sectional view through a pivotal connection embodying a modified form of the present invention;

Figure 8 is a transverse sectional view taken substantially on the line 8—8 of Fig. 7 showing in detail the interior construction of the improved pivotal connection shown therein;

Figure 9 is a longitudinal sectional view through a still further modified form of pivotal connection;

Figure 10 is a transverse sectional view taken substantially on the line 10—10 of Fig. 9 illustrating in detail the interior construction of the modified form of the invention shown therein.

With more particular reference to the drawing and particularly to the specific form of the invention illustrated in Figs. 1 to 4 thereof, it will be seen that the improved pivotal connections are utilized for inter-connecting the various members of a shock absorber assembly in a motor vehicle. It will be appreciated that the pivotal connections shown are susceptible of use in many and various applications and that the specific form shown in the drawing is merely illustrative of one specific particularly advantageous installation in which the improved pivotal connection may be used.

In Fig. 1 it is seen that a shock absorber 10 of conventional construction is permanently mounted upon one of the side frame members 11 of a vehicle and, as is conventional in constructions of this kind, the shock absorber has a forwardly extending actuating arm 12. This actuating arm is threaded at its end to provide a threaded bearing with one of the bores in the improved pivotal connection 13 and into the other bore of this pivotal connection is threaded the laterally bent and threaded end of a shock absorber link 14. The lower end of the link 14 is likewise laterally bent and threaded into a second pivotal connection 15, which is in turn threadably journaled upon a projection 16 formed as an integral part of a plate 17 bolted to a spring 18 by means of the conventional U-bolts 19.

From the foregoing it will be appreciated that the pivotal connections 13 and 15 provide threaded bearings for the ends of the link 14 and also for the portion of the shock absorber arm 12 and plate 17 to which they are secured. Each of the pivotal connections 13 and 15 is preferably provided with a suitable lubricant fitting 20 threaded therein as shown in detail below, which fitting as will subsequently be seen serves to provide lubricant for both of the threaded bearings in each of the pivotal connections.

As is clearly seen in Fig. 2, it has been found preferable to twist the inter-connecting link 14 slightly so that the laterally bent threaded ends thereof will not lie in the same plane. This construction has been found to place the entire shock absorber assembly under a slight tension which serves to take up wear in all of the threaded bearings in both pivotal connections.

One particularly advantageous form of pivotal connection is illustrated in the detailed views in Figs. 3 to 6, inclusive. Steps in the manufacture of this pivotal connection are shown in Figs. 5 and 6. It will be seen that the pivotal connection as a whole is formed from a single integral blank of sheet metal 30 which is provided with enlarged ends 31 and 32 which serve to provide sufficient metal for the extrusion process to which the blank is subjected. These enlarged ends 31 and 32 are provided with holes 33 and 34, respectively, therethrough and the blank is then placed in a press and extruded to provide cylindrically extending projections 35 and 36 which are open in their ends due to the holes 33 and 34. The blank is then formed to provide a depressed central portion 38 which meets the body portion of the blank at a relatively sharp angle providing relatively sharp cornered shoulders 39. The same stamping operation which serves to provide this depressed central portion may be utilized for the purpose of forming substantially semi-cylindrical longitudinally extending grooves 40 which inter-connect the depressed central portion with the cylindrical extruded portions 35 and 36.

After the blank has been formed to substantially the shape and configuration shown in Fig. 6, it is bent upon itself to shape the depressed central portion 38 into a cylindrical bore 41 and it will be seen that this bending operation serves to position the body portions of the blank face to face and the cylindrical projections 35 and 36 in axial alignment. It will be appreciated that the grooves 40 have been so formed and positioned that after the bending operation takes place they will mate to provide a substantially cylindrical duct communicating with the cylindrical bore 41 and the bore formed by the cylindrical projections 35 and 36. The body portion of the blank may now be welded together in face to face relation by copper welding or other suitable means, to secure these parts together.

It will be noted that the hole 34 is slightly smaller than the hole 33 and consequently the cylindrical projection or extension 36 will have its outer end of slightly reduced diameter. This outer end may be threaded to receive the lubricant fitting 20 shown in Fig. 1. The co-axially disposed cylindrical projections 35 and 36 may be internally threaded to provide a single internally threaded bore therethrough and the cylindrical bore 21 which extends in crossed axis relation with respect thereto may also be internally threaded.

After the blank has been bent to substantially its final form a length of copper wire is bent to provide a structure of substantially circular configuration and inserted within the bore 35. Due to the inherent resilience of this ring it will spring outwardly against the walls of the bore and thus retain itself in position. This copper wire provides the metal necessary for the weld and is preferably positioned adjacent the juncture of the bores 35 and 36. The fitting as a whole is then heated to welding temperature in an inert atmosphere and the copper from the wire will flow into the joint sealing the same.

In the form of the invention illustrated in Figures 7 and 8, it will be appreciated that the improved pivotal connection provides substantially the same resultant structure as that disclosed in the preferred form of the invention described above. However, it will be seen that the pivotal connection shown in this embodiment of the invention is formed of two separate members permanently secured together to provide a resultant integral unitary construction.

In this form of the invention a section of sheet metal 50 is provided with apertures in the end thereof. This section of sheet metal is preferably preformed in its longitudinal central portion substantially as has been described above, in order that when it is bent upon itself it will provide a substantially cylindrical bore 51 therethrough. The bore may be internally threaded as has been described above, and it will be noted that at the time the central portion of the stamping 50 was formed, it may be provided with longitudinally extending semi-cylindrical grooves which, after the stamping is bent, mate to form a substantially cylindrical duct 52 providing communication between the bore 51 and the apertures in the end of the stamping. It will be seen that the bending operation serves to bring these apertures into exact registry and a suitable internally threaded tubular member 53 may be seated in these apertures. The tubular member 53 is provided with an opening 54 in the side wall thereof which is adapted to register with the duct 52 to provide communication between the interior of the tubular member 53 and the interior of the internally threaded bore 51. The tubular member 53 may be of slightly reduced diameter at one end to provide an internally threaded aperture 55 adapted to receive a suitable lubricant fitting substantially as has been described in connection with the preferred embodiment of the invention above.

After the various parts have been assembled as is shown in Figure 7, they may be welded together to provide an integral unitary construction, and it will be readily appreciated that the resultant structure thus formed is substantially the same as that disclosed in the connection with the preferred embodiment of the invention.

In Figures 9 and 10, a still further modified form of the invention is shown in which the pivotal connection is formed from three separate members. A pair of sheet metal stampings 60 and 61 are preformed to provide mating semi-cylindrical depressions therein which, when placed face to face, together form a substantially cylindrical bore 62 therebetween. These stampings are provided with registering apertures adapted to receive an internally threaded tubular member 63 which has a suitable aperture 64 in the wall thereof, communicating with a duct 65 formed by mating semi-cylindrical depressions in the stampings 61 and 62. The mating stampings 60 and 61 and the tubular member 63 may all be simultaneously welded together in unit relation and it will be appreciated that the construction thus formed provides a pivotal connection substantially the same as that described in the form of the invention discussed in detail above.

It will be readily appreciated that the above described forms of the invention are merely illustrative of the generic inventive concept presented in this application. Many other and further modifications thereof falling within the scope of the invention as defined in the subjoined claims will be apparent to those skilled in the art.

What is claimed is:

1. The method of forming a pivotal connection which comprises extruding a pair of cylindrical portions from adjacent the ends of the sheet metal blank, depressing the central portion of said blank, forming grooves in the face of said blank extending from said depressed portion to said cylindrical portion, bending said blank upon itself to form said depressed portion into a cylindrical bore and to arrange said cylindrical portions in co-axial alignment, said grooves being arranged face to face to provide a duct communicating with said bore and said cylindrical portions, and securing said cylindrical portions in end to end abutting relation.

2. The method of forming a pivotal connection comprising extruding a pair of cylindrical portions adjacent the ends of the sheet metal blank, depressing the central portion of said blank, forming grooves in the face of said blank extending from said depressed portion to said cylindrical portion, bending said blank upon itself to form said depressed portion into a cylindrical bore and bringing said cylindrical portions in co-axial alignment, said grooves mating to provide a duct between said cylindrical portions and said cylindrical bore, securing said cylindrical portions in end to end abutting relation, internally threading the same and internally threading said cylindrical bore.

3. The method of producing a pivotal connection which comprises forming a pair of sheet metal stampings having grooves therein and apertures therethrough, securing said stampings together face to face with said apertures in registry and said grooves mating to provide a bore between said stampings, securing a tubular member in said registering apertures and internally threading said tubular member and said bore.

4. A pivotal connection comprising a sheet metal member bent upon itself in its central portion to provide a substantially cylindrical bore, said bore being internally threaded, the end portions of said strip each being preformed to provide co-axially arranged tubular portions which together mate to form a substantially continuous cylindrical bore extending transversely to said first mentioned bore, the mid portions of said strip being preformed to together provide a duct establishing communication between said bores.

5. A pivotal connection comprising a sheet metal member bent upon itself in substantially its central portion to provide a transversely extending substantially cylindrical bore therethrough, said bore being internally threaded, said sheet metal member having axially aligned apertures in the ends thereof and an internally threaded tubular member secured in position in said apertures.

6. A pivotal connection comprising a pair of sheet metal members each preformed to provide a semi-cylindrical depression therein, said semi-cylindrical depressions mating to provide a substantially cylindrical bore between said members when the same are secured together, said members having axially aligned apertures therein and an internally threaded tubular member secured in position in said axially aligned apertures.

7. A pivotal connection comprising a sheet metal strip preformed adjacent its ends to provide tubular projections extending substantially at right angles to the adjacent portion of the strip, said strip being bent upon itself to provide a transversely extending substantially cylindrical bore between the portions of the strip adjacent the mid portion thereof whereby when said strip is so bent said tubular portions will be co-axially arranged.

8. A pivotal connection comprising a pair of sheet metal members each preformed to provide a semi-cylindrical depression therein adjacent one end thereof, said members each being provided with an aperture adjacent the opposite end thereof and preformed to provide a groove interconnecting said semi-cylindrical depression and said aperture, said members being secured together face-to-face whereby said semi-cylindrical depressions together form a substantially cylindrical bore and said grooves together serve to provide a duct establishing communication between said apertures and said bore.

9. A pivotal connection comprising a pair of sheet metal members each preformed to provide a semicylindrical depression therein adjacent one end thereof, said members each being provided with an aperture adjacent the opposite end thereof and preformed to provide a groove interconnecting said semi-cylindrical depression and said aperture, said members being secured together face-to-face whereby said semi-cylindrical depressions together form a substantially cylindrical bore and said grooves together serve to provide a duct establishing communication between said apertures and said bore, and a tubular member seated in position in said apertures and having a port in the wall thereof adapted to establish communication with the duct formed by said grooves.

JOHN W. LEIGHTON.